US012540693B2

(12) United States Patent
Tarantini et al.

(10) Patent No.: US 12,540,693 B2
(45) Date of Patent: Feb. 3, 2026

(54) DEVICE FOR ATTACHING A SPRAYER TO A ROBOTIC ARM

(71) Applicant: EXEL INDUSTRIES, Epernay (FR)

(72) Inventors: Joseph Tarantini, La Terrasse (FR); Sylvain Perinet, Giez (FR)

(73) Assignee: EXEL INDUSTRIES, Epernay (FR)

( * ) Notice: Subject to any disclaimer, the term of this patent is extended or adjusted under 35 U.S.C. 154(b) by 617 days.

(21) Appl. No.: 17/951,005

(22) Filed: Sep. 22, 2022

(65) Prior Publication Data

US 2023/0096659 A1 Mar. 30, 2023

(30) Foreign Application Priority Data

Sep. 29, 2021 (FR) ........................................ 2110294

(51) Int. Cl.
| | | |
|---|---|---|
| *F16L 19/065* | (2006.01) | |
| *B05B 13/04* | (2006.01) | |
| *B25J 11/00* | (2006.01) | |
| *B25J 15/00* | (2006.01) | |
| *B25J 15/04* | (2006.01) | |

(52) U.S. Cl.
CPC ........ *F16L 19/065* (2013.01); *B05B 13/0431* (2013.01); *B25J 11/0075* (2013.01); *B25J 15/0019* (2013.01); *B25J 15/045* (2013.01)

(58) Field of Classification Search
CPC .. B25J 15/045; B25J 15/0408; B25J 11/0075; B05B 13/0431; B05B 15/65; F16L 19/06; F16L 19/061; F16L 19/065; F16L 19/075
USPC ......................................... 285/322, 323, 324
See application file for complete search history.

(56) References Cited

U.S. PATENT DOCUMENTS

| | | | | |
|---|---|---|---|---|
| 3,339,944 A | * | 9/1967 | Poague ............... | F16L 37/0985 |
| | | | | 285/39 |
| 4,790,571 A | * | 12/1988 | Montanari ........... | F16L 37/133 |
| | | | | 405/251 |
| 5,918,913 A | * | 7/1999 | Lewis ................. | F16L 37/0985 |
| | | | | 285/239 |
| 7,056,387 B2 | | 6/2006 | van der Steur | |

(Continued)

FOREIGN PATENT DOCUMENTS

| EP | 0670448 A1 | 9/1995 |
|---|---|---|
| EP | 3222360 A1 | 9/2017 |

OTHER PUBLICATIONS

NPI Search Report for FR 2110294, May 13, 2022, 2 pages.

*Primary Examiner* — David Bochna
(74) *Attorney, Agent, or Firm* — Soquel Group LLC

(57) ABSTRACT

An attachment device configured for attaching a product sprayer for coating workpieces onto a robotic arm, the attachment device including a cover which is rigidly attached to the robotic arm and which has a substantially cylindrical shape extending along a longitudinal axis, a nut with a substantially cylindrical shape mounted on the cover and including a first helical portion, a substantially annular flange mounted rigidly attached to the sprayer, including a second helical portion arranged for mating with the first helical portion of the nut, and a deformable ring mounted on the nut and including an annular portion providing an axial stop of the ring with respect to the nut, and a deformable portion configured for being deformed by interacting with the flange so as to provide a connection between the flange and the ring.

10 Claims, 4 Drawing Sheets

(56) References Cited

U.S. PATENT DOCUMENTS

| | | | |
|---|---|---|---|
| 2002/0008386 A1* | 1/2002 | Lee | F16L 19/005 |
| | | | 285/322 |
| 2003/0066911 A1* | 4/2003 | Mauchle | B05B 15/65 |
| | | | 239/707 |
| 2005/0056212 A1* | 3/2005 | Schaupp | B05B 15/65 |
| | | | 118/300 |
| 2017/0014845 A1* | 1/2017 | Dreher | B05B 13/0431 |
| 2019/0060940 A1* | 2/2019 | Smoot | B05B 13/0431 |
| 2021/0370498 A1* | 12/2021 | Kudo | B25J 15/045 |

\* cited by examiner

DEVICE FOR ATTACHING A SPRAYER TO A ROBOTIC ARM

CROSS-REFERENCE TO RELATED APPLICATION

This application is a U.S. non-provisional application claiming the benefit of French Application No. 21 10294, filed on Sep. 29, 2021, the contents of which are incorporated herein by reference in their entirety.

FIELD OF THE INVENTION

The invention relates to the general technical field of spraying devices for coating products, typically robots for painting, coating or lacquering products.

BACKGROUND OF THE INVENTION

Conventionally, in large-scale production lines, the coating or painting operations are carried out by spraying devices mounted on robotic arms. A sprayer is attached to the end of a robotic arm configured for moving the sprayer during a step of coating a workpiece, for covering the surfaces of the workpiece which have to be covered.

Conventionally, such sprayers are attached to the robot arm in a removable manner, so as to be able to carry out maintenance operations or a change of sprayer. Well-known attachment devices for sprayers thus provide assembling using screwed assemblies, or thread-tapping, which can be used for obtaining removable assemblies with a simple design.

Since operations for maintenance or for changing a sprayer necessarily involve stopping the robot, it is advantageous to reduce the disassembly time of the sprayer as much as possible, and thus to reduce the number of screwed assemblies used for attaching the sprayer to the robot arm. Furthermore, in a paint spraying environment, suspended paint particles can accumulate on surfaces exposed to the external environment, and foul the exposed elements. It is thus particularly useful to leave only smooth surfaces exposed to the exterior, and to cover the attachment elements used for mounting the sprayer onto the robotic arm, as much as possible. Spray devices incorporating a single nut have been proposed, making it possible to provide a rigid assembly by means of a high tightening torque, and an ease of use which reduces disassembly time, while providing easy-to-clean external surfaces by encapsulating functional surfaces so to insulate same from the exterior.

U.S. Pat. No. 7,056,387, e.g., discloses an electrostatic sprayer which can be mounted on a robot arm and which includes a cover and a nut screwed onto an external thread of the robot arm.

However, during operation cycles, vibrations caused by the functioning of the robot and of the sprayer are transmitted to the thread-tapping assemblies and lead to a loosening thereof, sometimes resulting in detachment of the sprayer and of the robot arm.

EP-A-0670448 discloses a rotary coupling device which can be used within the framework of supplying a robot arm equipped with a sprayer. EP-A-3222360 discloses a bayonet mounting system which is used for mounting an air skirt on an air turbine stator, not for attaching a sprayer onto a robotic arm. In this way, the above problem is not solved.

There is thus a need to improve the systems for fastening sprayers onto robot arms, which would be simple and fast to use and would prevent risks of disassembly due to vibrations.

SUMMARY OF THE DESCRIPTION

For the assembly of a spraying device onto a robot arm, the invention proposes an attachment device configured for attaching, onto a robotic arm, a sprayer for products for coating work-pieces, the attachment device including:
- a cover configured for being attached to one among the sprayer and the robotic arm, having a substantially cylindrical shape extending along a longitudinal axis,
- a nut able to slide and rotate mounted on the cover, including a first helical portion, and a stop on the cover configured for stopping the nut axially with respect to the cover, and
- a flange configured for being attached to another among the sprayer and the robotic arm, including a second helical portion arranged for mating with the first helical portion of the nut, characterized in that the device further includes a deformable ring mounted on the nut, the ring including a deformable portion and an annular portion, the annular portion having at least one stop member configured for interacting with a ring stop formed on the nut for axially stopping the ring with respect to the nut,
and in that the flange includes an interfacing portion arranged for interacting with the deformable ring in such a way that, when tightening the nut for locking the flange onto the cover, the deformable portion is deformed so as to interact with the interfacing portion of the flange so as to provide a connection between the flange and the ring.

Such a configuration may be used, when the helical connection between the nut and the flange loosens due to vibrations, for maintaining mechanical connection between the cover and the flange, by means of the ring. Such a device is still very quick and easy to use, while preventing risks of disassembly due to vibrations.

Optionally but advantageously, the invention has the following features, taken individually or in combination:
- the cover has a coupling portion, and the nut includes a second coupling portion matching the coupling portion of the cover, so as to be apt to rotationally couple the cover and the nut selectively along the longitudinal axis; in this way, the nut can be loosened by applying a rotational force to the cover;
- the cover has, on an outer surface, at least one recess suitable for mating with a tool; in this way, a high torque may be applied to the cover, thus improve the tightening;
- the cover has a third helical portion arranged for interacting with a matching portion on the robot arm for attaching the device to the robot arm, the third helical portion having an inverse pitch with respect to the pitch of the first helical portion; in this way, loosening of the connection between the sprayer and the cover is prevented when the nut is tightened;
- the cover is arranged so as to be apt to interact, when the flange is removed, with the deformable portion of the deformable ring so as to release the connection between the ring and the flange; in this way, the flange may be released by manipulating the cover, and the device may be easily removed;
- the deformable portion of the deformable ring has an annular distribution of claws extending substantially longitudinally from the annular portion of the deformable ring either away from or towards the longitudinal axis, in such a way that the ends of the claws define a circle with a first diameter, the interfacing portion of the flange defines a circle with a second diameter, different from the first diameter, the first diameter and the second diameter and the claws being configured in such a way that the claws remain within their elastic deformation range during the actuation of the device; in this way, assembly of the device is easier and does not require use of a tool, due to use of a deformable element exerting a return force maintaining the assembly;

the first diameter is smaller than the second diameter;

the cover has a first end and a second end, and a disassembly portion arranged at the second end, the disassembly portion having a third diameter section configured for interacting with the claws of the ring so as to move the claws away from the position thereof so as to release the interfacing portion of the flange when the cover is moved axially towards the flange; and the coupling portion and the disassembly portion are spaced apart by a first axial distance, and wherein the second coupling portion and the claws are spaced apart by a second axial distance, the first axial distance being equal to the second axial distance; in this way, during disassembly, it is possible to use the cover to simultaneously spread the claws for releasing the flange and rotating the nut for loosening the flange, which greatly facilitates disassembly of the device.

According to a second aspect, the invention relates to a spraying robot including an attachment device according to the invention.

BRIEF DESCRIPTION OF THE DRAWINGS

Other features and advantages of the invention will be clear from the description thereof which is given hereinafter as an example, but not limited to, with reference to the enclosed figures.

For greater clarity, identical or similar elements are identified by identical reference signs in all of the figures.

DETAILED DESCRIPTION

The invention relates to an attachment device 1 configured for attaching, onto a robotic arm, a sprayer P for products for coating work-pieces, inter alia paint, lacquer, coat, glue, or any product which may be sprayed.

Figure 1:
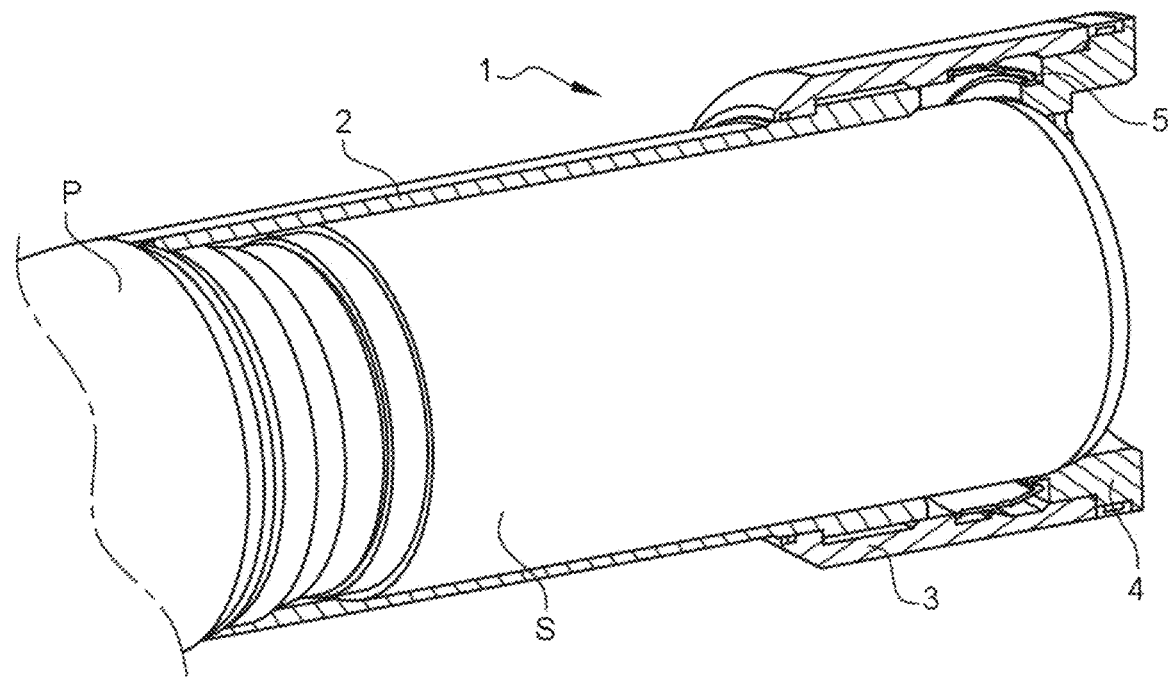
FIG. 1 is a partial sectional representation of different parts for using a device according to an embodiment of the invention, which shows a sectional view of a cover, of a nut, of a deformable ring, of a flange for attaching to the robot, of sprayer frame, and of an inner shaft.

With reference to FIG. 1, in one embodiment of the invention, attachment device 1 includes a cover 2 attached to sprayer P, a nut 3 for rigidly attaching cover 2, and an annular flange 4 provided for attaching, onto the robotic arm, a deformable ring 5. A support S extends inside cover 2 and is connected to sprayer P and to flange 4.

It is obvious that an embodiment which is not shown herein has an inverse mounting, and includes a cover attached to the robot arm and a flange attached to sprayer P.

When sprayer P is attached to the robot arm, annular flange 4 is connected to cover 2 by means of nut 3. Deformable ring 5 is arranged so as to interact with nut 3 and flange 4 so as to prevent detachment of flange 4 from cover 2 in the event that nut 3 becomes loose. Cover 2 is attached to sprayer P by tightening a screwed connection, and support S is then compressed between sprayer P and flange 4.

Figure 2:
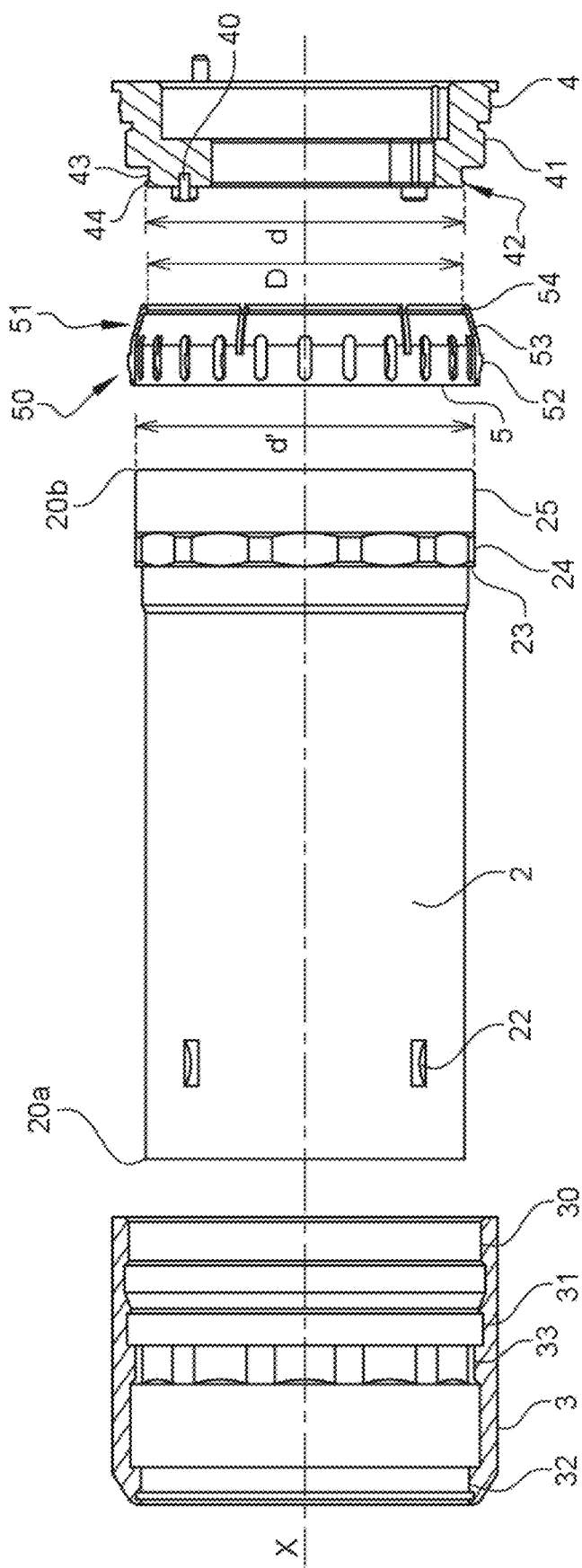
FIG. 2 is a profile representation of elements composing an attachment device according to an embodiment of the invention, showing a sectional view of a nut, of a cover, of a ring, and of a flange.

With reference to FIG. 2, cover 2 has a substantially cylindrical shape extending along a longitudinal axis X between a first end 20a and a second end 20b. In the present application, the notions of radial and transverse are defined with respect to the longitudinal axis and the cylindrical geometry of the elements. Radially inner means closer to longitudinal axis X, and radially outer means farther from longitudinal axis X. Nut 3, flange 4 and ring 5 have a geometry of revolution along longitudinal axis X.

In the embodiment shown, nut 3 has a substantially cylindrical shape, mounted onto cover 2, able to slide and rotate, radially surrounding cover 2. Nut 3 includes a first helical portion 30, a ring stop 31 configured for providing an axial stop of deformable ring 5 with respect to nut 3, and a cover stop 32 configured for providing an axial stop of cover 2 with respect to nut 3. Cover stop 32 is arranged at one end of nut 3 opposite helical portion 30. In the embodiment shown, cover stop 32 includes a shoulder extending radially towards the inside of nut 3.

Advantageously, cover 2 has a recess 22 configured for mating with a tool allowing loosening or tightening of cover 2.

Second end 20b of cover 2 has a nut stop 23 configured for mating with cover stop 32 so as to provide an axial stop between nut 3 and cover 2. In such embodiment, nut stop 23 includes a shoulder extending radially towards the outside of cover 2.

Advantageously, cover 2 has a coupling portion 24, and nut 3 has a second coupling portion 33 matching coupling portion 24 of cover 2, coupling portions 24 and 33 being configured in such a way that when cover 2 is moved axially until coupling portion 24 and second coupling portion 33 interact, same provide the rotational coupling of cover 2 and of nut 3. In this way, cover 2 may be used for loosening nut 3 from flange 4. This is particularly advantageous when a tool is used for driving cover 2 by means of the recesses 22 provided on cover 2.

In the embodiment shown, coupling portion 24 and second coupling portion 33 each include a polygonal section formed on a surface of cover 2 and of nut 3, respectively, which are intended for being positioned facing each other. In a variant, coupling portion 24 and second coupling portion 33 each include a mechanical stop providing transmission of a force along a tangential direction, so as to transmit a torque between cover 2 and nut 3.

Helical portion 30 is arranged at one end of nut 3 for interacting with a matching surface formed on flange 4 so that flange 4 and nut 3 may be assembled together. For simplicity, in the present description it is understood that a helical portion is a portion of a surface on which a tapping or a threading has been provided, for mating with a matching surface so as to provide a helical screw-nut connection.

Ring stop 31 includes an annular pressing surface which is axially delimited by two shoulders. In the embodiment shown, ring stop 31 is arranged on a radially inner surface of nut 3, and deformable ring 5 is configured for being located radially inside nut 3. In a variant, ring stop 31 includes a pin protruding along a radial direction from nut 3, the pin interacting with a recess made in deformable ring 5 so as to provide the axial stop of deformable ring 5 with respect to cover 2.

In a variant (not shown), nut 3 is located radially inside cover 2, deformable ring 5 is configured for being arranged radially outside nut 3 and radially inside cover 2, and ring stop 31 is arranged on the radially outer surface of nut 3.

Flange 4 has a substantially annular geometry and includes centering elements 40 configured for rotationally rigidly attaching support S and flange 4. Flange 4 includes a second helical portion 41 arranged for mating with first helical portion 30 of nut 1, so that flange 4 and nut 3 may be assembled together and tightened.

Flange 4 further has an interfacing portion 42 arranged for interacting with deformable ring 5 and for providing rigid attachment of flange 4 and ring 5 even in the event of loosening between first 30 and second 41 threaded or tapped portions. In the embodiment shown, interfacing portion 42 includes an annular pressing surface 43 extending substantially axially, and an axial stop 44 extending radially.

Deformable ring 5 includes an annular portion 50 and a deformable portion 51. Deformable portion 51 consists of an elastic material exerting a return force when deformed in the elastic deformation range thereof. Annular portion 50 includes a stop element 52 configured for interacting with ring stop 31 of nut 3, so as to provide an axial stop of deformable ring 5 with respect to nut 3. In the embodiment shown, stop element 52 includes a plurality of pins distributed along the ridge of ring 5, forming a plurality of stops arranged so as to be integrated, during mounting, into the annular portion of ring stop 31. A first stop of ring stop 31 interacts with ring stop element 52, and a second stop interacts with an axial end of ring 5, so as to axially retain ring 5 in both directions, with respect to nut 3. In a variant (not shown), the stop element includes a groove or a recess configured for mating with a pin or an obstacle made on nut 3.

Deformable portion 51 includes an annular distribution of claws 53 extending substantially longitudinally from annular portion 50 of deformable ring 5 either away from or towards longitudinal axis X, in such a way that the ends of claws 53 define a circle with a first diameter D. Interfacing portion 42 of flange 4 defines a circle with a second diameter d, different from first diameter D. Thus, during mounting, claws 53 are deformed so as to be moved away from the rest position thereof, flange 4 is positioned axially so that interfacing portion 42 and the ends of claws 53 coincide axially, and claws 53 are released. The return force exerted by claws 53 allows same to return to the initial position thereof so as to interact with interfacing portion 42. The ratio between first D and second d diameters is configured in such a way that claws 53 exert a force providing the holding of flange 4 even when first 30 and second 41 threaded or tapped portions are loosened.

Length of claws 53, the ratio between first diameter D and second diameter d, and material of deformable part 51 are configured so that claws 53 remain in the elastic deformation range thereof during actuation of the device.

Advantageously, claws 53 have a retaining element 54 at the end thereof, configured for reinforcing the holding in axial position of flange 4 with respect to ring 5. Such retaining portion may include an obstacle, inter alia a pin, a stop, a claw, or a surface configured for enhancing friction between claw 53 and interfacing portion 42, e.g., by means of a particular profile or a pair of materials enhancing friction.

In the embodiment shown, claws 53 consist of a wall portion substantially defining an angular fraction of a frustoconical portion, and retaining element 54 consists of the wall forming claw 53, at one end of claw 53 opposite annular portion 50.

Cover 2 has, at second end 20b thereof, a disassembly portion 25 having a section with a third diameter d' configured for interacting with claws 53 of ring 5 so as to move claws 53 away from the position thereof so as to release interfacing portion 42 from flange 4 when cover 2 is axially moved towards flange 4. In this way, flange 4 may be disassembled when cover 2 is moved towards flange 4.

In the embodiment shown, cover 2 slides radially inside annular portion 50 of ring 5 and moves claws 53 away from longitudinal axis X. The third diameter d' is thus configured so as to be greater than first diameter D, but less than the diameter of annular portion 50 of ring 5.

In a variant wherein cover 2 slides radially outside annular portion 50 of ring 5, and thus brings claws 53 closer to longitudinal axis X, third diameter d' is thus configured so as to be less than first diameter D, but greater than the diameter of annular portion 50 of ring 5.

Length of claws 53, the ratio between first diameter D and third diameter d', and the material of deformable part 51 are configured so that claws 53 remain in the elastic deformation range thereof during actuation of device 1.

Figure 3:
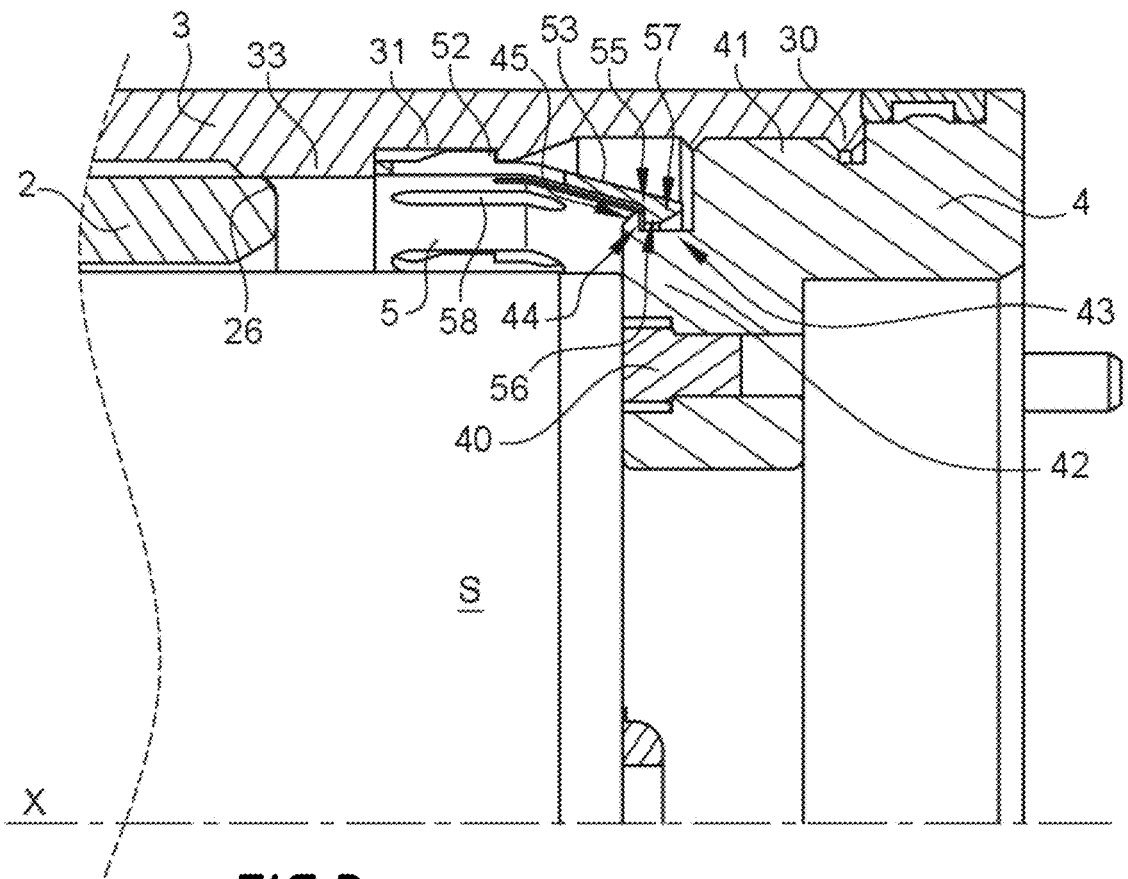
FIG. 3 is a profile representation of elements forming an attachment device according to the invention, showing a sectional view of a nut, of a cover, of a ring, of a flange, and of an internal shaft.

With reference to FIG. 3, retaining element 54 includes a first portion 55 extending radially, a second portion 56 extending substantially axially from first portion 55, and a third portion 57 extending from second portion 56 either away from or towards longitudinal axis X.

First portion 55 is arranged for coming into contact with axial stop 44 of flange 4, and thus providing an axial stop between flange 4 and ring 5 when flange 4 is assembled with nut 3.

Second portion 56 is arranged for coming into contact with annular pressing surface 43, and thus providing a radial positioning between flange 4 and ring 5 when flange 4 is assembled with nut 3.

Third portion 57 is configured for facilitating mounting of flange 4 in ring 5. To this end, in the embodiment shown, second portion 56 is positioned radially externally with respect to annular pressing surface 43, and third portion 57 extends away from longitudinal axis X. Third portion 57 is configured in such a way that the end thereof is further away from longitudinal axis X than half of second diameter d. The assembly of third portion 57 thus forms a guide for interfacing portion 42, which makes it possible, during mounting, to move claws 53 away by pressing on flange 4, which greatly facilitates mounting.

Interfacing portion 42 further includes a guiding portion 45 configured so as to have an inclination substantially equivalent to the inclination of third portion 57, in such a way that, during mounting, claws 53 move away by mating with third portions 57, which reduces risk of damaging claws 53 by compressing claws 53 instead of moving same radially.

In a variant (not shown), claw 53 is configured in such a way that, during mounting, second portion 56 is positioned radially internally with respect to annular pressing surface 43, third portion 57 extending by getting closer to longitudinal axis X. In such variant, third portion 57 is configured in such a way that the end hereof is closer to longitudinal axis X than half of second diameter d.

Advantageously, one or more recesses 58, inter alia grooves, drilled holes or oblong holes, are provided through ring 5. In this way, the stiffness of ring 5 is reduced and capacity thereof to deform radially is increased, which facilitates mounting of ring 5 on nut 3.

Advantageously, cover 2 has, on disassembly portion 25, a softened edge 26, e.g., by means of a fillet or a chamfer, in order to prevent contact between a sharp edge and claws 53 during disassembly of the device, and thus reducing wear of claws 53.

Figure 4:
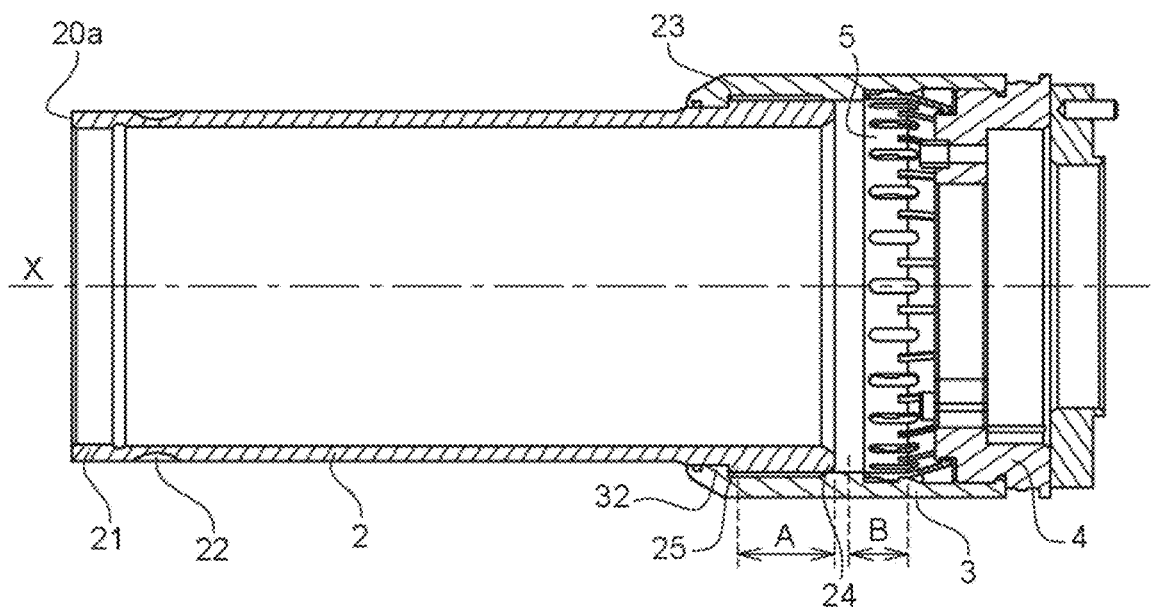
FIG. 4 is a profile representation of an attachment device according to the invention, showing a sectional view of a nut, of a cover, of a ring, and of a flange, which illustrates a first embodiment of the ring.

With reference to FIG. 4, cover 2 has, at the first end 20a thereof, a third helical portion 21 arranged for interacting with a matching portion on sprayer P for attaching device 1 to sprayer P. Third helical portion 21 has an inverse pitch with respect to the pitch of first helical portion 30. In this way, loosening of connection between sprayer P and cover 2 is prevented when nut 3 is tightened. Furthermore, in this way disassembly is facilitated, since, for disassembling device 1, it is necessary to rotate cover 2 only in one direction.

Advantageously, corresponding axial positions of the coupling portion 24, disassembly portion 25, second coupling portion 33, ring stop 31, and claws 53 are all configured for allowing cover 2 to be positioned with respect to nut 3 so as to simultaneously provide interaction between coupling portion 24 and second coupling portion 33 on the one hand, and disassembly portion 25 and claws 53 on the other hand.

In the embodiment shown, as a result, there is a first axial distance A between coupling portion 24 and disassembly portion 25, which is equal to a second axial distance B between second coupling portion 33 and claws 53. The second axial distance B corresponds to the sum of the distance between second coupling portion 33 and ring stop 31 and the distance between stop element 52 and claws 53, more precisely, a cross section of claws 53 at which the distance between the claw and longitudinal axis X is equivalent to half of third diameter d'.

This allows flange 4 to be loosened by a single manipulation of cover 2, which greatly facilitates use of device 1. Furthermore, in this way, all surfaces which provide attachment of sprayer P onto the robot arm, are isolated from the outside environment, which reduces fouling.

Figure 5A:
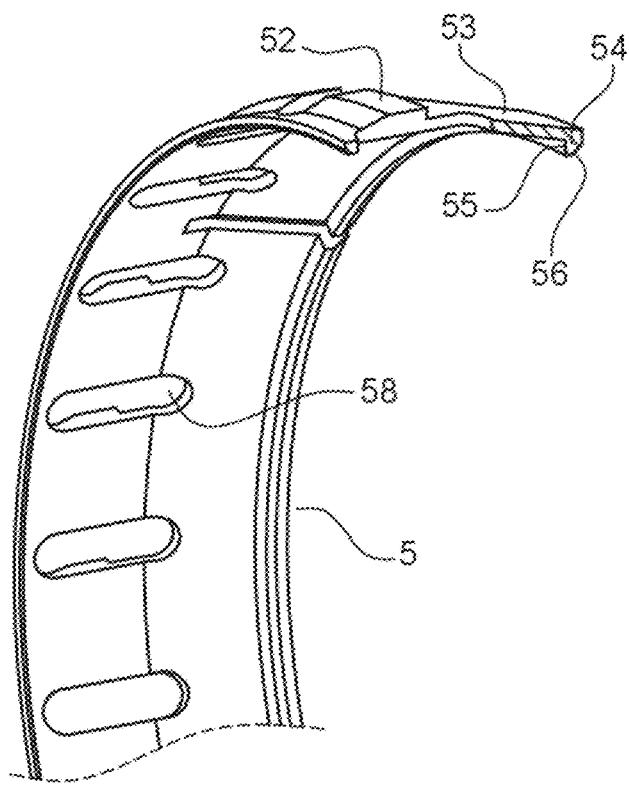
FIGS. 5a and 5b show a second embodiment of the ring, FIG. 5a showing a partial section of the ring which shows details of the profile of the ring, FIG. 5b showing the whole ring.
Figure 5B:
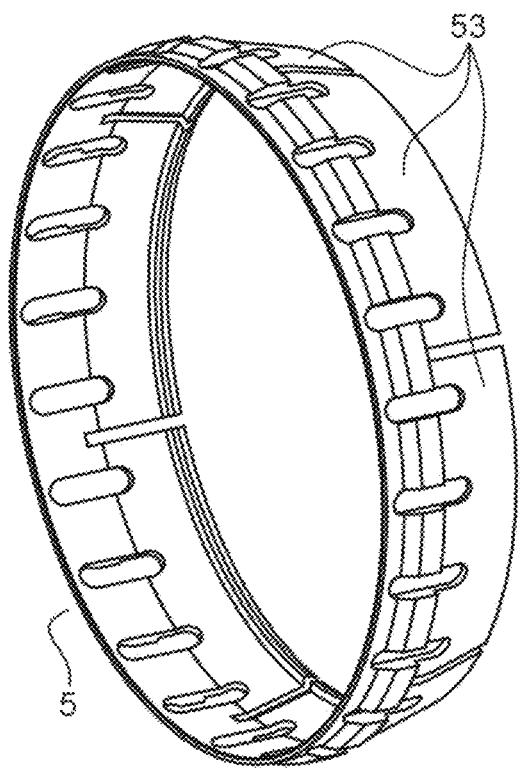

With reference to FIGS. 5a and 5b, ring 5 includes 6 claws 53, every claw forming an angular fraction of a frustoconical portion, claws 53 being separated from one another by grooves. Such an embodiment may be used for increasing rigidity of every claw, with respect to an embodiment wherein ring 5 contains more claws 53, while preserving mobility of claws 53 when same are displaced by disassembly portion 25. In this way, holding of flange 4 by claws 53 is improved.

Use of the Device

When such an attachment device 1 is used for attaching a sprayer P to a robotic arm, a user mounts nut 3 on cover 2 so as to bring cover 2 into the stop position by bringing cover stop 32 and nut stop 23 into contact.

Ring 5 is then assembled with nut 3, mating of ring stop 31 and stop element 52 providing holding of ring 5 in position with respect to nut 3.

Flange 4 is then assembled with nut 3 by means of the helical portions. When flange 4 is tightened, claws 53 of ring 5 are moved away from longitudinal axis X by interaction of interface element 42 and of third portions 57, and then re-close when the relative axial position of flange 4 and nut 3 make the closing possible, i.e., when first portions 55 coincide axially with axial stop 44 of flange 4.

A tightening force may be applied by placing cover 2 axially with respect to nut 3 in such a way that coupling portion 25 of cover 2 and second coupling portion 33 mate, in order to tighten nut 3 on flange 4 by applying a torque on cover 2. A tool may be used with recesses 22 of cover 2 for applying a high tightening torque.

Cover 2 is then moved axially towards sprayer P in order to tighten cover 2 on sprayer P by means of third helical portion 21. Support S maintains axial spacing between flange 4 and sprayer P, which provides tightening of cover 2 to provide contact between nut stop 23 and cover stop 32, and thus provide attachment of sprayer P onto the robotic arm.

When device 1 is disassembled, cover 2 is unscrewed from sprayer P and then brought into an axial position allowing both claws 53 to be moved apart, thus releasing interfacing portion 42 from flange 4, and also enabling coupling portion 25 of cover 2 and second coupling portion 33 to mate. In this way, flange 4 may be released and nut 3 may be loosened in a single manipulation.

The invention claimed is:

1. An attachment device for attaching, onto a robotic arm, a sprayer for products for coating workpieces, the attachment device comprising:
    a cover for attaching to (i) the sprayer or (ii) the robotic arm, the cover having a substantially cylindrical shape extending along a longitudinal axis;
    a nut able to slide and rotate, mounted on said cover, comprising:
        a first helical portion; and
        a cover stop axially stopping the nut relative to said cover;
    a deformable ring mounted on said nut, the ring comprising:
        a deformable portion; and
        an annular portion, the annular portion comprising at least one stop member interacting with a ring stop formed on said nut, so as to provide an axial stop of the ring with respect to said nut; and
    a flange for attaching to (i) the sprayer if the cover is attached to the robotic arm, or to (ii) the robotic arm if the cover is attached to the sprayer, the flange comprising:
        a second helical portion mating with said first helical portion of said nut; and
        an interfacing portion interacting with said deformable ring in such a way that, when tightening said nut for locking the flange onto said cover, said deformable portion is deformed so as to interact with said interfacing portion to provide a connection between the flange and said deformable ring.

2. The device according to claim 1, wherein said cover comprises a coupling portion, and said nut comprises a second coupling portion matching said coupling portion of said cover, to selectively rotationally couple said cover and said nut along the longitudinal axis.

3. The device according to claim 1, wherein said cover interacts, during disassembly of said flange, with said deformable portion of said deformable ring to release the connection between said ring and said flange.

4. The device according to claim 1, wherein said deformable portion of said deformable ring comprises an annular distribution of claws extending substantially longitudinally from said annular portion of said deformable ring either away from or towards the longitudinal axis, in such a way that the ends of the claws define a circle with a first diameter, said interfacing portion of said flange defining a circle with a second diameter different from the first diameter, the first diameter and the second diameter and the claws being configured in such a way that the claws remain in the elastic deformation range thereof during actuation of the device.

5. The device according to claim 4, wherein the first diameter is smaller than the second diameter.

6. A sprayer robot comprising an attachment device according to claim 1.

7. An attachment device for attaching, onto a robotic arm, a sprayer for products for coating workpieces, the attachment device comprising:
 a cover for attaching to (i) the sprayer or (ii) the robotic arm, the cover having a substantially cylindrical shape extending along a longitudinal axis, and the cover comprising, on an outer surface, at least one recess for mating with a tool;
 a nut able to slide and rotate, mounted on said cover, comprising:
  a first helical portion; and
  a cover stop axially stopping the nut relative to said cover;
 a deformable ring mounted on said nut, the ring comprising:
  a deformable portion; and
  an annular portion, the annular portion comprising at least one stop member interacting with a ring stop formed on said nut, so as to provide an axial stop of the ring with respect to said nut; and
 a flange for attaching to (i) the sprayer if the cover is attached to the robotic arm, or to (ii) the robotic arm if the cover is attached to the sprayer, the flange comprising:
  a second helical portion mating with said first helical portion of said nut; and
  an interfacing portion interacting with said deformable ring in such a way that, when tightening said nut for locking the flange onto said cover, said deformable portion is deformed so as to interact with said interfacing portion to provide a connection between the flange and said deformable ring.

8. An attachment device for attaching, onto a robotic arm, a sprayer for products for coating workpieces, the attachment device comprising:
 a cover for attaching to (i) the sprayer or (ii) the robotic arm, the cover having a substantially cylindrical shape extending along a longitudinal axis, and the cover comprising a first helical portion arranged for interacting with a matching portion on the robot arm, for attaching the device onto the robot arm;
 a nut able to slide and rotate, mounted on said cover, comprising:
  a second helical portion having an inverse pitch with respect to the pitch of said first helical portion; and
  a cover stop axially stopping the nut relative to said cover;
 a deformable ring mounted on said nut, the ring comprising:
  a deformable portion; and
  an annular portion, the annular portion comprising at least one stop member interacting with a ring stop formed on said nut, so as to provide an axial stop of the ring with respect to said nut; and
 a flange for attaching to (i) the sprayer if the cover is attached to the robotic arm, or to (ii) the robotic arm if the cover is attached to the sprayer, the flange comprising:
  a third helical portion mating with said second helical portion of said nut; and
  an interfacing portion interacting with said deformable ring in such a way that, when tightening said nut for locking the flange onto said cover, said deformable portion is deformed so as to interact with said interfacing portion to provide a connection between the flange and said deformable ring.

9. An attachment device for attaching, onto a robotic arm, a sprayer for products for coating workpieces, the attachment device comprising:
 a cover for attaching to (i) the sprayer or (ii) the robotic arm, the cover having a substantially cylindrical shape extending along a longitudinal axis, and the cover comprising:
  a first end;
  a second end; and
  a disassembly portion arranged at said second end;
 a nut able to slide and rotate, mounted on said cover, comprising:
  a first helical portion; and
  a cover stop axially stopping the nut relative to said cover;
 a deformable ring mounted on said nut, the ring comprising:
  an annular portion comprising at least one stop member interacting with a ring stop formed on said nut, so as to provide an axial stop of the ring with respect to said nut; and
  a deformable portion comprising an annular distribution of claws extending substantially longitudinally from said annular portion either away from or towards the longitudinal axis, in such a way that the ends of the claws define a circle with a first diameter; and
 a flange for attaching to (i) the sprayer if the cover is attached to the robotic arm, or to (ii) the robotic arm if the cover is attached to the sprayer, the flange comprising:
  a second helical portion mating with said first helical portion of said nut; and
  an interfacing portion interacting with said deformable ring in such a way that, when tightening said nut for locking the flange onto said cover, said deformable portion is deformed so as to interact with the interfacing portion to provide a connection between the flange and said deformable ring, the interfacing portion defining a circle with a second diameter different from the first diameter, the first diameter and the second diameter and the claws being configured in such a way that the claws remain in the elastic deformation range thereof during actuation of the device, and wherein said disassembly portion comprises a section with a third diameter interacting with the claws of said ring so as to move the claws away from the position thereof, so as to release said interfacing portion from the flange when said cover is axially displaced towards said flange.

10. The device of claim 9, wherein said cover comprises a coupling portion, and said nut comprises a second coupling portion matching said coupling portion of said cover, to selectively rotationally couple said cover and said nut along the longitudinal axis, and wherein said coupling portion and said disassembly portion are spaced away by a first axial distance, and wherein said second coupling portion and said claws are spaced away by a second axial distance, the first axial distance being equal to the second axial distance.

* * * * *